Patented Jan. 18, 1927.

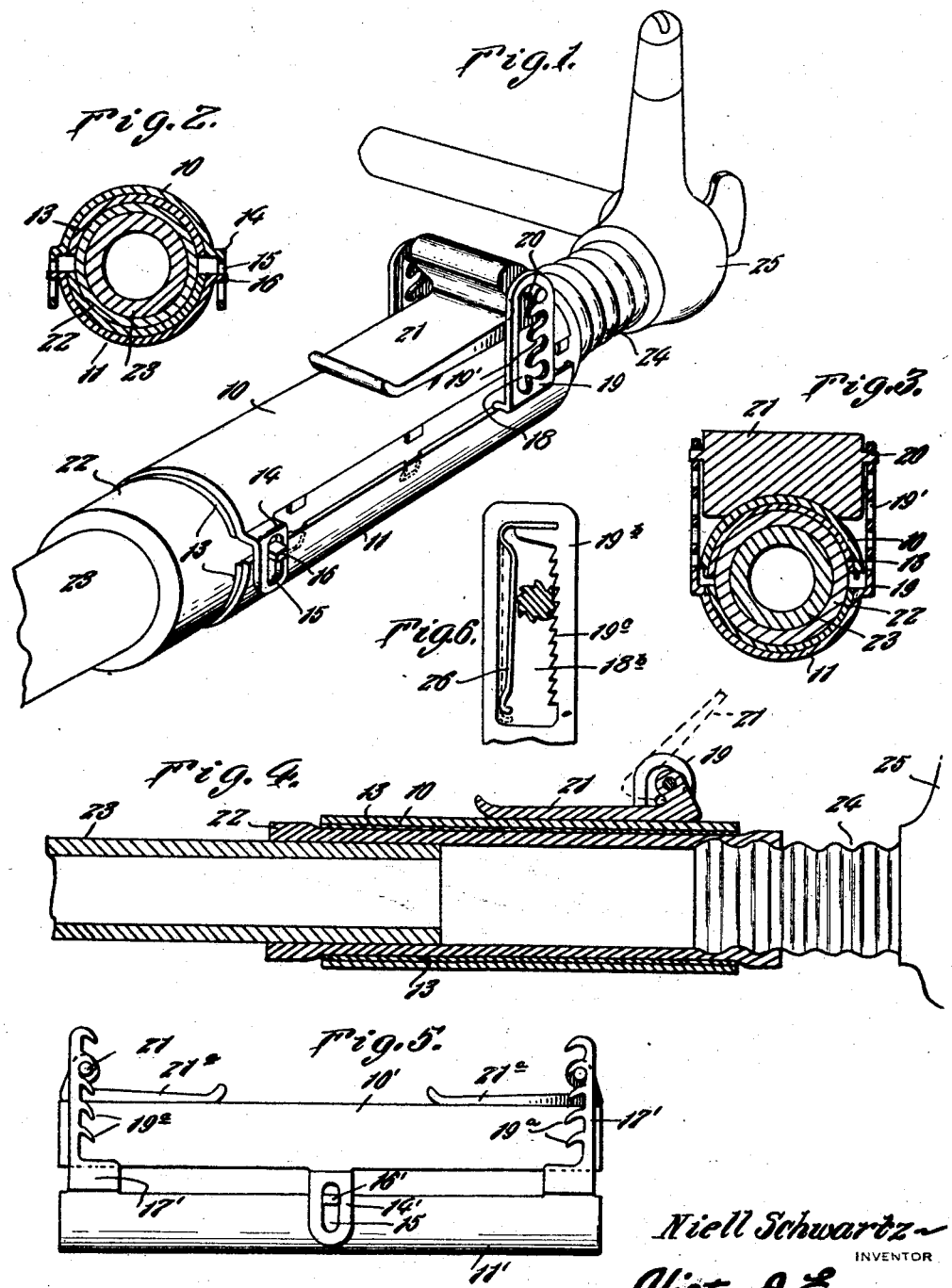

1,615,142

UNITED STATES PATENT OFFICE.

NIELL SCHWARTZ, OF BROOKLYN, NEW YORK.

HOSE CLAMP.

Application filed April 30, 1926. Serial No. 105,822.

This invention relates to improvements in hose clamps.

The primary object of the invention resides in a hose clamp especially adapted for use in securely holding the attachment end of a hose or tube in sealing engagement with the nipple of a gas fixture or gas appliance for the purpose of preventing the accidental escape of gas therefrom, and which escape of gas often results in gas asphyxiation of the occupants of a room or dwelling, and sometimes causes fire and explosion with the resultant damages.

Another object of the invention resides in a hose clamp which may be used for various other purposes such as an emergency patch for temporarily sealing a leak in a fire hose, should the same accidentally become punctured or fractured.

A further object is to provide a hose clamp which may be easily and quickly applied to hoses of various diameters, and which clamp may be initially adjusted to the approximate size to receive the hose and after insertion thereon, the same may be finally adjusted to securely clamp the hose to the nipple of a gas fixture.

With these and other objects in view, the invention resides in certain novel construction and combination and arrangement of parts, the essential features of which are hereinafter fully described, are particularly pointed out in the appended claims, and are illustrated in the accompanying drawing, in which:—

Figure 1 is a perspective view of my invention showing the same in position for connecting the end of a gas tube with the nipple of a gas fixture.

Figure 2 is a vertical longitudinal sectional view therethrough.

Figure 3 is a vertical transverse sectional view on the line 2—2 of Figure 1.

Figure 4 is a similar view on the line 4—4 of Figure 1.

Figure 5 is a side elevation of a modified form of my invention.

Figure 6 is a modified form of bearing bracket and trunnions for the cam levers.

Referring more particularly to the drawing, the reference numerals 10 and 11 respectively designate a pair of semi-cylindrical separable sections, which co-act to provide a radially adjustable sleeve. The sections are constructed of a light bendable metal and have their inner faces provided with yieldable linings 13.

The section 10 is provided with a pair of opposed spaced ears 14 which extend beyond the longitudinal edges of the section at one end thereof. The ears 14 are respectively provided with elongated slots 15 for the reception of outwardly extending lugs 16 projecting from the longitudinal edges of the section 11 adjacent one end thereof. It will be seen that the walls of the slots and the lugs co-act to provide a guide means for bringing the sections in alignment and for preventing the longitudinal creeping of one section with respect to the other. If desired, the lugs may serve as pivots for permitting one of the sections to be swung with respect to the other.

Adjacent the other end of the section 11, there is provided a pair of opposed brackets 19 which are slightly offset with respect to the longitudinal edges of the section to permit the section 10 to snugly fit therebetween. The brackets are provided with vertical slots 18, from which spaced aligned branch slots 19' extend, and which walls of the slots 19' serve as seats for the trunnions 20 extending from opposite sides of a cam lever 21. It will be seen that the slots 18 establish communication between the slots 19' to permit the cam lever to be pivoted on various planes.

In the drawing, I have shown my improved hose clamp as applied to the attachment end 22 of a flexible gas tube or hose 23, and which end 22 telescopes the nipple 24 of a gas jet 25. When applying the clamp, the same is adjusted to permit the sections to separate in order to freely receive the attachment end 22. The final adjustment is obtained by moving the trunnions of the cam lever into the desired aligned slots 20, with the cam lever in a raised position. After the clamp has been applied, the cam lever 21 is swung downward so that the same comes in pressing engagement with the section 10, thereby causing the sections 10 and 11 to be drawn toward each other, and in clamping engagement with the attachment end of the hose. This clamping action tends to hold the attachment end of the hose in sealing engagement with the nipple 24 and prevents the accidental escape of gas from the joint.

In Figure 5 of the drawing, I have shown a slightly modified form of my invention, in which the ears 14' of the section 10' are disposed midway between the ends of the section for the reception of lugs 16' carried by the sections 11' midway between the ends of said section. Pairs of spaced brackets 17' are provided adjacent the ends of the section 11' and which brackets 17' are provided with aligned hooks 19ª for receiving the trunnions of the respective cam levers 21ª. It will be seen that in this form of the invention, I provide clamping means at opposite ends of the sections whereby an even pressure may be maintained in hose clamps for the purpose of serving as patches in fire hose. I have also shown in this form a modified construction of supporting bracket for the cam levers, which permits the levers to be removed from their bearings when obtaining the final adjustment of the clamping sections.

In Figure 6, I have shown a further modified form of bearing for the cam lever in which the bracket 19ᴮ is slotted as at 18ᴮ. One of the walls of the slot is provided with teeth 19ᶜ for engagement by ratchet teeth 20ᴮ provided on the pintle 20ᶜ of the cam lever. A flat spring 26 serves to hold the ratchet teeth on the pintle in co-acting engagement with the teeth 20ᴮ.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. A hose clamp comprising a pair of separate co-acting curved sections adapted to be fitted over a hose, co-acting means on said sections for preventing longitudinal movement of said sections, one with respect to the other, and clamping means carried by one of said sections and engageable with the other of said sections for holding the sections in a clamped position around a hose, said clamping means including opposed spaced brackets having a plurality of aligned seats therein, and a cam lever having trunnions for engagement with the respective aligned seats for pivotally mounting said cam lever on said brackets at various elevations.

2. A hose clamp comprising a pair of separable curved co-acting sections, ears provided on one of said sections and having slots therein, lugs extending from the other of said sections and movable in the slots of the respective ears, opposed brackets on said last mentioned section, and a cam lever pivoted in said brackets and movable into pressing engagement with said first mentioned section.

3. A hose clamp comprising a pair of separable curved co-acting sections, having yieldable linings on the inner faces thereof, ears provided on one of said sections and having slots therein, lugs extending from the other of said sections and movable in the slots of the respective ears, opposed brackets on said last mentioned section, aligned seats in said opposed brackets and a cam lever having trunnions for engagement with any of the aligned seats and movable into pressing engagement with said first mentioned section.

In testimony whereof I have affixed my signature.

NIELL SCHWARTZ.